(12) United States Patent
Vigneron et al.

(10) Patent No.: US 7,855,648 B2
(45) Date of Patent: Dec. 21, 2010

(54) RFID TAG

(75) Inventors: Patrick Jacob Vigneron, Grand Rapids, MI (US); Peter Phaneuf, Grand Rapids, MI (US)

(73) Assignee: Avery Dennison Corporation, Pasadena, CA (US)

( * ) Notice: Subject to any disclaimer, the term of this patent is extended or adjusted under 35 U.S.C. 154(b) by 639 days.

(21) Appl. No.: 11/893,268

(22) Filed: Aug. 14, 2007

(65) Prior Publication Data

US 2009/0045963 A1  Feb. 19, 2009

(51) Int. Cl.
- G08B 13/14 (2006.01)
- A61F 13/15 (2006.01)
- B32B 38/04 (2006.01)
- B32B 37/00 (2006.01)

(52) U.S. Cl. .............. 340/572.8; 340/572.1; 340/572.5; 156/226; 156/227; 156/264; 156/290

(58) Field of Classification Search .............. 340/572.1, 340/572.2, 572.8; 156/226, 227, 264, 290
See application file for complete search history.

(56) References Cited

U.S. PATENT DOCUMENTS

| | | | | |
|---|---|---|---|---|
| 4,510,489 A * | 4/1985 | Anderson et al. | ........ | 340/572.1 |
| 4,811,000 A * | 3/1989 | Humphrey et al. | .......... | 340/551 |
| 5,291,180 A * | 3/1994 | Reeb | ....................... | 340/572.5 |
| 5,357,240 A * | 10/1994 | Sanford et al. | ............ | 340/572.8 |
| 5,528,222 A * | 6/1996 | Moskowitz et al. | ...... | 340/572.7 |
| 5,583,489 A * | 12/1996 | Loemker et al. | ......... | 340/572.8 |
| 5,790,029 A * | 8/1998 | Curnutte et al. | .......... | 340/572.1 |
| 5,838,253 A * | 11/1998 | Wurz et al. | .............. | 340/10.42 |
| 5,973,598 A | 10/1999 | Beigel | | |
| 5,973,600 A | 10/1999 | Mosher, Jr. | | |
| 6,018,299 A | 1/2000 | Eberhardt | | |
| 6,091,332 A | 7/2000 | Eberhardt et al. | | |
| 6,111,506 A * | 8/2000 | Yap et al. | .................. | 340/572.1 |
| 6,246,327 B1 | 6/2001 | Eberhardt | | |
| 6,254,953 B1 * | 7/2001 | Elston | ........................ | 428/40.1 |
| 6,281,795 B1 * | 8/2001 | Smith et al. | .............. | 340/572.1 |
| 6,317,648 B1 | 11/2001 | Sleep et al. | | |
| 6,375,780 B1 * | 4/2002 | Tuttle et al. | .................. | 156/226 |
| 6,380,858 B1 * | 4/2002 | Yarin et al. | .............. | 340/573.1 |
| 6,451,154 B1 | 9/2002 | Grabau et al. | | |
| 6,520,544 B1 * | 2/2003 | Mitchell et al. | ................ | 283/70 |
| 6,522,945 B2 | 2/2003 | Sleep et al. | | |
| 6,667,092 B1 | 12/2003 | Brollier et al. | | |
| 6,724,311 B1 * | 4/2004 | Kolton et al. | ............ | 340/572.8 |
| 6,827,817 B2 | 12/2004 | Bleckmann et al. | | |

(Continued)

FOREIGN PATENT DOCUMENTS

WO  WO2007/024764  3/2007

*Primary Examiner*—Daniel Wu
*Assistant Examiner*—Mark Rushing
(74) *Attorney, Agent, or Firm*—Roberts Mlotkowski Safran & Cole, P.C.; Thomas W. Cole

(57) ABSTRACT

A radio frequency identification (RFID) tag is disclosed. The RFID tag can include a blank onto which indicia is printed. The blank may further have an RFID chip and antenna disposed thereon. The blank may further be mounted on a carrier web and may also be laminated. The laminated RFID tag may then be disposed into a container and may be used for storing and transmitting information regarding the container or its contents.

16 Claims, 3 Drawing Sheets

U.S. PATENT DOCUMENTS

| | | | |
|---|---|---|---|
| 6,836,215 | B1 | 12/2004 | Laurash et al. |
| 6,977,589 | B2 * | 12/2005 | Loop et al. ............... 340/572.8 |
| 7,014,729 | B2 | 3/2006 | Grabau et al. |
| 7,045,186 | B2 | 5/2006 | Grabau et al. |
| 7,091,864 | B2 | 8/2006 | Veitch et al. |
| 7,176,799 | B1 | 2/2007 | Golicz et al. |
| 2001/0028308 | A1 * | 10/2001 | De La Huerga .......... 340/573.1 |
| 2004/0238098 | A1 | 12/2004 | Bleckmann et al. |
| 2005/0108044 | A1 * | 5/2005 | Koster ........................... 705/2 |
| 2005/0139325 | A1 | 6/2005 | Bleckmann et al. |
| 2005/0205202 | A1 | 9/2005 | Chaoui et al. |
| 2006/0132311 | A1 | 6/2006 | Kruest et al. |
| 2006/0145860 | A1 | 7/2006 | Brown et al. |
| 2007/0039687 | A1 | 2/2007 | Hamilton et al. |
| 2007/0075141 | A1 | 4/2007 | Veitch et al. |
| 2008/0061140 | A1 * | 3/2008 | McMahon ................... 235/385 |
| 2008/0088448 | A1 * | 4/2008 | Steidinger ................ 340/572.1 |

* cited by examiner ated drugs as compared to conventional and presently less costly barcode tracking technologies alone, economic considerations must also be taken into account. Thus, any RFID system for use within the pharmaceutical and nutraceutical industries, among others, is likely to be adopted only if the individual RFID tags or labels can be produced in an economically viable manner on an industrial scale while offering value over RFID tags or labels currently used.

RFID TAG

FIELD

The invention generally relates to communication devices and more specifically relates to radio frequency identification (RFID) tags.

BACKGROUND

The use of radio frequency identification (RFID) to wirelessly identify one of a plurality of items is well known. Typical radio frequency identification (RFID) tags or labels include a microprocessor, also known as a microchip, functionally connected to an antenna. The microprocessor stores and processes relevant data that predictably includes unique data for identifying a specific item. The microprocessor also modulates a radio frequency (RF) signal that is transmitted via the antenna. An external reader (interrogator) is used to capture the data transmitted by the RFID tag.

Conventional RFID tags are either "active" (with an internal power source) or "passive" (without an internal power source). Passive RFID tags are energized by the electromagnetic field produced by the reader. Passive tags are currently preferred for many types of supply chain applications.

Accordingly, RFID tags can be attached to items entering or within a supply chain and the identifying information received can be processed for various reasons in a variety of manners. RFID tags are particularly useful in identifying, tracking and controlling items such as pallets, packages and individual product containers. For example, RFID labels are often applied to the exteriors of individual containers through the use of pressure sensitive adhesives.

As with many products contained in individual containers within supply chains, obtaining pedigree information at the item-level is beneficial within supply chains for pharmaceutical products and nutraceutical products (e.g., vitamins, herbal products, nutritional supplements, etc.). Nevertheless, companies managing and utilizing portions of pharmaceutical and nutraceutical supply chains are also understandably concerned about problems such as tampering because unsuspecting customers can suffer serious health consequences, which, in addition to the direct health consequences this can have on individual customers, can damage a business's image and cause unneeded liabilities. In order to combat tampering of individual containers, some have proposed differing mechanisms for associating an RFID device with the top or the seal surrounding the top of a pharmaceutical container in a way that can be detected when the top is opened or the seal is broken, respectively.

Moreover, adulteration, counterfeit and theft are problems similar to tampering that also can damage a business's image as well as its bottom line and must be addressed within a pharmaceutical or nutraceutical supply chain. Due to the volume, outright counterfeited (fake) and fraudulently diluted drugs currently have a substantial impact on the health of consumers as well as the financial well being of pharmaceutical companies. Thus, counterfeit and compromised drugs within the pharmaceutical industry are large enough problems that many national and local governments across the world are considering implementing or updating laws, regulations and/or procedures addressing the identification and tracking of pharmaceutical products. Additionally, the pharmaceutical companies themselves and the industry as a whole are continually working to address such problems and are showing considerable interest in safe and efficient item-level pedigree tracking.

While RFID technology is a currently offered and utilized technology for tracking the pedigree of pharmaceutical products and continues to show increased promise as a means to further combat counterfeit and compromised drugs as compared to conventional and presently less costly barcode tracking technologies alone, economic considerations must also be taken into account. Thus, any RFID system for use within the pharmaceutical and nutraceutical industries, among others, is likely to be adopted only if the individual RFID tags or labels can be produced in an economically viable manner on an industrial scale while offering value over RFID tags or labels currently used.

SUMMARY

An exemplary embodiment of the present invention discloses a system and method for tracking. The system can include a radio frequency identification (RFID) blank with indicia printed thereon. The system may also have an RFID antenna and chip coupled with the RFID blank as well as a carrier web coupled to the RFID blank. Further embodiments of the system have a laminated seal disposed over the RFID blank, RFID antenna and chip and carrier web after they are folded on top of each other to form an RFID tag. Also, the system may involve a container that contains items and into which the RFID tag is disposed and a lid that seals the container. The RFID tag may then be utilized to store information regarding the container.

Another exemplary embodiment of the invention refers to a method of supplying data for contents housed in a container. The method can include printing indicia on an outside portion of a plurality of blanks as well as placing radio frequency identification (RFID) antennas and chips on an inside portion of the plurality of blanks. The method may further include the steps of placing the plurality of blanks on a carrier web, folding the plurality of blanks onto themselves and laminating the plurality of blanks. Further embodiments of the method involve separating individual blanks from the plurality of blanks to form individual RFID tags and then placing an RFID tag into a container. Also, the method can include the step of preventing tampering with the RFID tag by sealing the container.

Yet another exemplary embodiment of the invention refers to a method of preventing tampering with an RFID tag. This method may include means for providing a radio frequency identification (RFID) substrate and means for printing human-readable indicia on the RFID substrate. This method may also have means for disposing a RFID chip and antenna on the RFID substrate to form an RFID tag in addition to means for sealing the RFID tag against outside elements. Finally, this method can utilize means for disposing the RFID tag in a container and means for sealing the container.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Generally referring to FIGS. 1-4, a system and method for tracking product a product or product data using an RFID tag that may be made and deposited in a container. RFID tags may be formed in bulk, for example with a variety of other RFID tags. The tags may include any of a variety of information, both printed on a portion of the tag itself and stored on a microchip. Further, the tags may be sealed and deposited in a container.

Figure 1A:
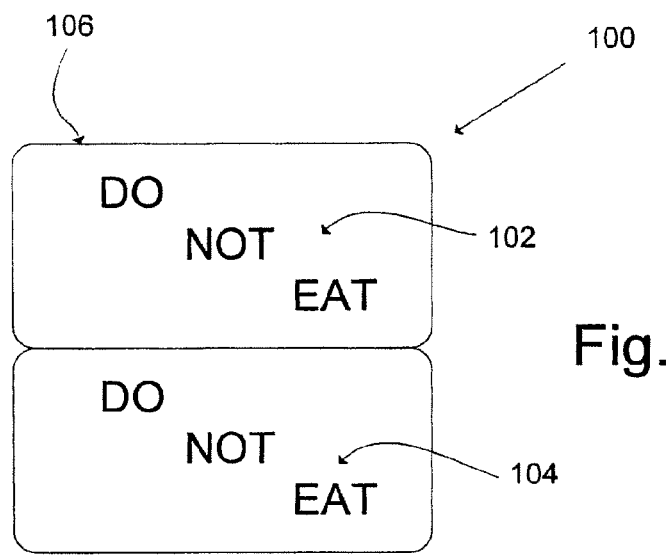
FIG. 1A is an exemplary view of the outside of an unfolded RFID tag.
Figure 1B:
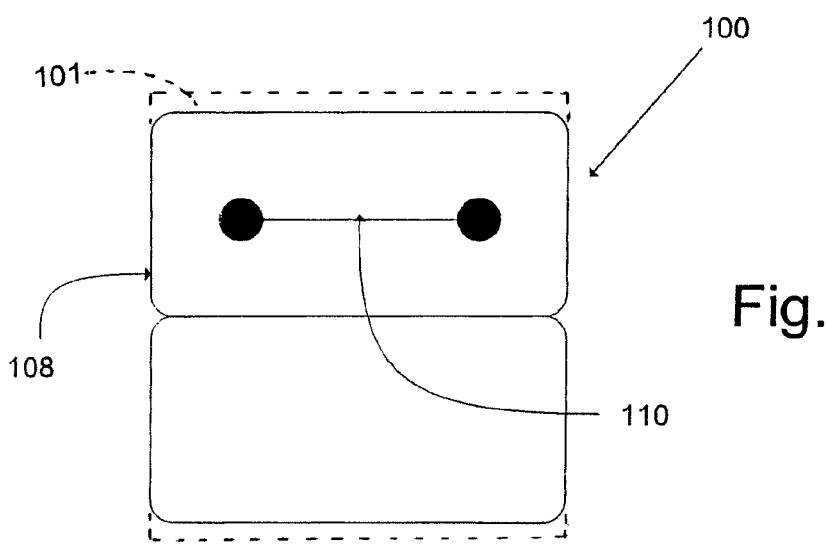
FIG. 1B is an exemplary view of the inside of an unfolded RFID tag.
Figure 2:
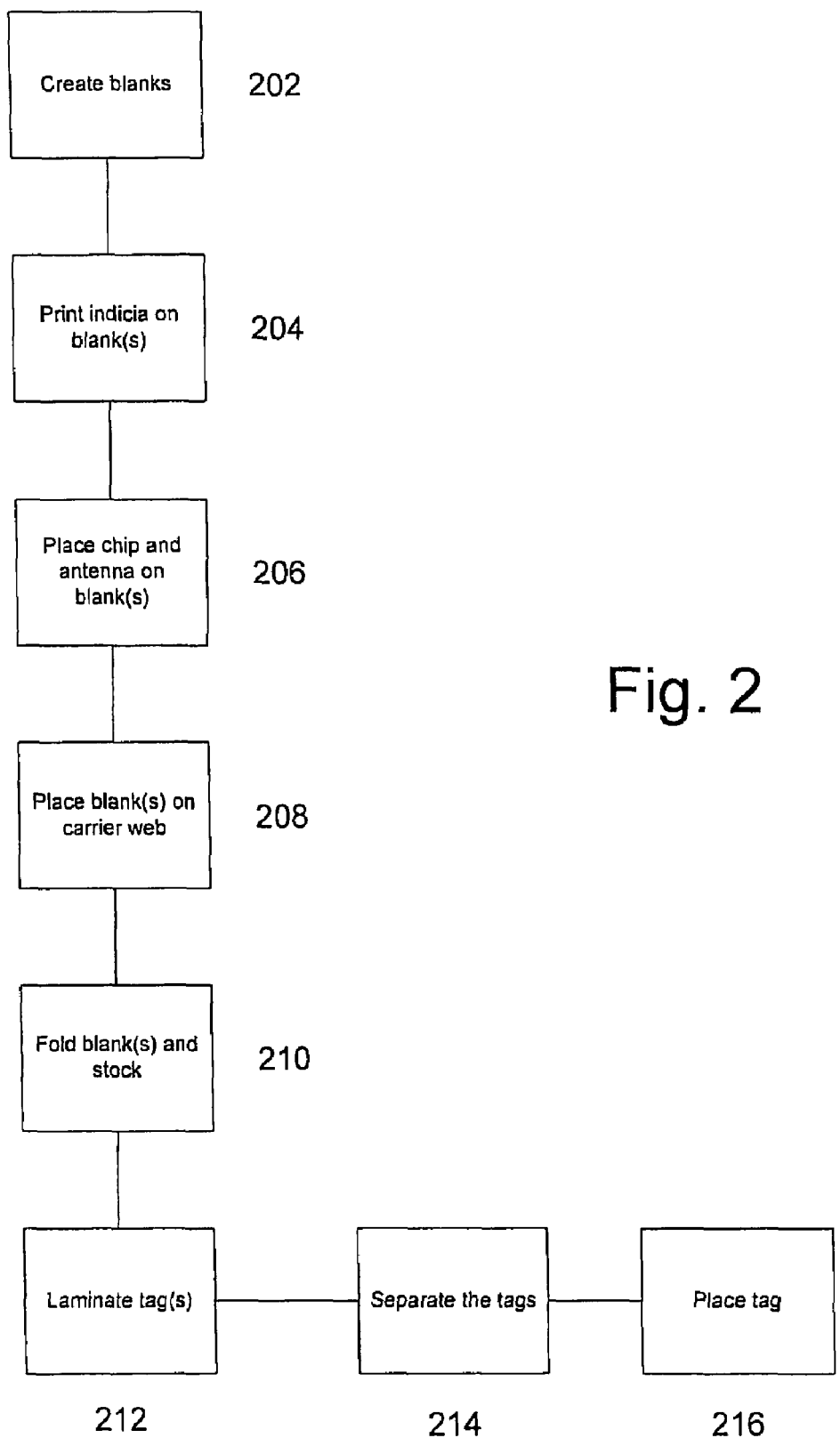
FIG. 2 is an exemplary flowchart showing a method of making and using an RFID tag.

In a first exemplary embodiment, as shown in FIGS. 1A-B and FIG. 2, an RFID tag may be constructed. In step 202, a series of blanks to be used for RFID tags may be created. Each blank 100 may act as a substrate for the RFID tag and any indicia printed thereon or stored therein. Also, each blank 100 may be formed out of any material, for example paper, plastic, synthetic paper, reinforced paper, cardboard, synthetic paper-coated cardboard or any other material known to one having ordinary skill in the art and suitable for the desired application. Additionally, the blanks may, in some exemplary embodiments, have a coating that may help with the adherence of ink, toner or the like and may assist a laminate with sealing a finished product. Further, any number of RFID tags may be formed in a continuous format with individual blanks. Thus, in some exemplary embodiments, a string of blanks may be connected in side-by-side format or may be formed in matrices having any desired orientation and number of blanks, for example a matrix of three by twelve blanks. The blanks themselves may be physically joined together or the blanks may be joined through the use of another material, non-limiting examples of which are described in further detail below. Also, if the blanks are formed together, they may include registration marks disposed between individual blanks. The registration marks may be used to denote any of a variety of information, include where to separate the blanks from one another.

Referring back to FIGS. 1A and 1B, any indicia 102 or 104, such as human-readable indicia, may be printed on at least an outside portion 106 of an individual blank 100 in step 204. The human-readable indicia 102 and 104 may be any wording or numbers. For example, in some embodiments, RFID tag information or warning information, such as the phrase "DO NOT EAT," may be included in the human-readable indicia, as one non-limiting example. Other embodiments may include other visually identifiable data printed onto the outside portion 106 an individual blank 100. For example, a bar code or other identifiable pattern or design may be used to provide or convey information regarding the RFID tag or to provide a form of ornamental design. The printing may be performed by any manner known to one having ordinary skill in the art, for example, ink jet or laser printing or impact printing, and any indicia may be applied to any number of blanks. For example, indicia may be applied to each blank 100 on a continuous string of tag blanks, as described previously.

In some further exemplary embodiments, in step 206, an antenna and chip 110 for an RFID tag may be placed on an inside portion 108 of an individual blank 100. The antenna and chip 110 may be of any type of RFID chip known to one having ordinary skill in the art. The antenna may be used to received data for the RFID chip or transmit data from the RFID chip, as is well known in the art. Also, in further exemplary embodiments, the inside portion 108 on which an antenna and a chip for an RFID tag may be an inner construction of the RFID tag, for example a portion of the tag that may not be visible after the final assembly of the tag is completed. After the placement of the antenna and chip 110 onto the blank 100 in step 206, the blank 100 may be placed on a carrier web (indicated in phantom in FIG. 1B), for example, a synthetic stock or cellulose-based stock, in step 208. The blank 100 may be adhered to the carrier web in any manner known to one having ordinary skill in the art. However, in other exemplary embodiments, the placement of an antenna and chip 110 onto a blank 100 may be performed at any desired time, for example, after the placement of a blank 100 or series of blanks on a carrier web as well as when a blank 100 or series of blanks are being printed. Further exemplary embodiments may use registration marks that may be disposed on the carrier web and denote any of a variety of information, include where to separate individual blanks from one another.

In a further exemplary embodiment, the blank 100 and the carrier web to which it is adhered may be folded on themselves in step 210. The folding may be performed sequentially, for example, with each blank 100 being folded one-by-one, or substantially simultaneously, whereby a continuous string of blanks, such as that described earlier, may be folded as the web of blanks is fed past a nip to complete the folding or simultaneously where an entire series, such as ten or more are folded. The folding of a blank 100 may be performed so that the RFID antenna and chip 110 are disposed on an interior portion of the folded blank 100 and so that printed indicia 102 and 104 appear on an exterior portion of the folded blank 100. Following the folding in step 210, the folded blank 100 may be laminated in step 212. Alternatively, the folding and lamination may occur substantially simultaneously with the blank being disposed on the laminating film.

Any form of lamination may be used, for example, lamination through the use of adhesive, heat, pressure or any other manner known to one having ordinary skill in the art. For example, the lamination of the RFID tags may be performed by passing the tags through laminating rollers. Other non-limiting methods of lamination may include the use of any known pressure sensitive adhesive (PSA).

Figure 3:
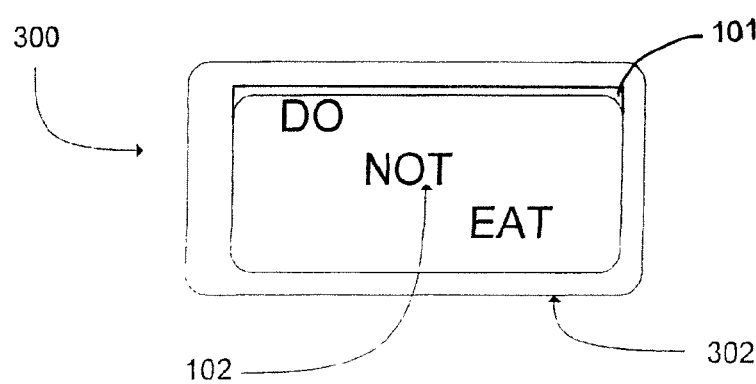
FIG. 3 is an exemplary top-down view of a folded and laminated RFID tag.

As shown in the top-down view of FIG. 3, the lamination may also act to seal and form an RFID tag 300. For example, an individual RFID tag 300 may be sealed inside the film 302 and the seal provided by the film 302 may act to prevent exposure of the RFID tag 300 elements inside the film 302 to outside elements. Also, in some exemplary embodiments, the film may act to prevent damage to the tag, for example, by protecting the integrity and functionality of the RFID antenna and chip 110. Further, in some exemplary embodiments, the film 302 that is laminated over RFID tag 300 may be substantially clear or transparent in order to allow printed indicia, for example printed indicia 102 in FIG. 3, to be legible or viewable to a reader or scanner.

After the tags are folded and laminated, in some exemplary embodiments, any tags 300 formed together may be separated from one another via perforations in the web, slitting or any other cutting in step 214. For example, the tags 300 may separated using a die cutter, cutting wheel, laser cutting device or any other cutting device known to one having ordinary skill in the art. The individual tags 300 may be formed in any size, for example about 0.75" by 0.40", and sizing of the tags is generally dependent upon the needs of the customer or end user application. Individual tags 300 may then be separated and relocated or placed as desired in step 216. The tags may undergo testing to determine whether the tags are emitting a signal or not. Tags which fail the testing may be ejected from the processing line or otherwise marked so that they can be removed or ejected at a later point.

In further exemplary embodiments, an individual tag 300 may have any of a variety of properties. For example, an individual tag 300 may be flexible so as to allow for a tag to be packaged with other articles that may move, contact or jostle the tag 300. An individual tag 300 may also be damage resistant and water proof or water resistant. An individual tag 300 thus may be used in any of a variety of locations to store and convey any desired information, for example, the location of the tag 300 and any information regarding the location of the tag 300 and the contents with which the tag 300 is packaged and/or the articles in proximity to the tag 300.

Figure 4:
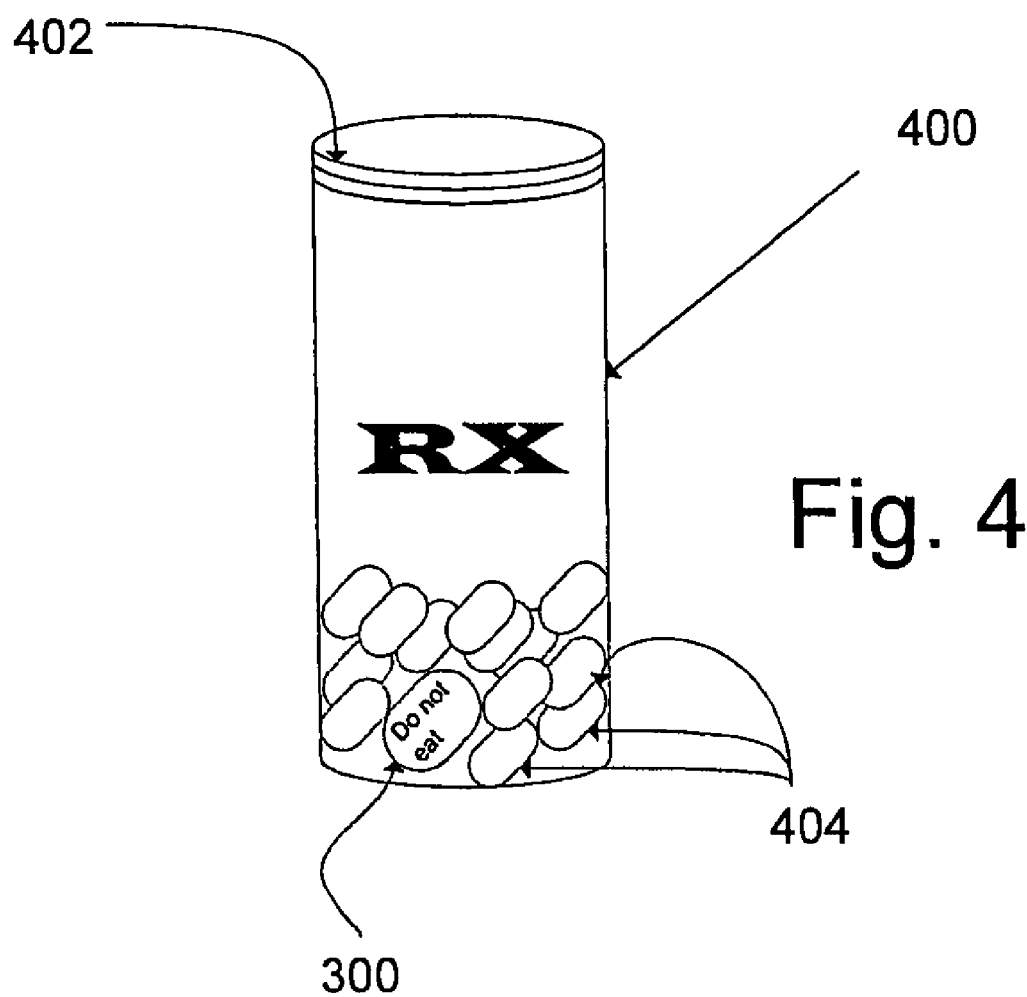
FIG. 4 is an exemplary view of an RFID tag in a container.

In another exemplary embodiment, as shown in FIG. 4, the tag 300 may be deposited in any type of container, for example a pharmaceutical, nutraceutical, consumable food product (e.g. human or animal), or personal care product container 400. The tag 300 may be deposited or plunged into the container 400 at any time, for example, before or after any other contents have been added to the container 400. Also, if the tag 300 is deposited in the container 400 prior to any or some other items or contents being added to container 400, the construction of the tag 300 may be such that any contact between any contents of the container 400 and the tag 300 or any pressure exerted on the tag 300 by any contents of the container 400 may not cause any damage to the tag 300. The tag 300 may then be sealed in an individual container 400 through the use of a cap, lid 402 or the like in order to seal the container 400 and prevent its contents, for example medication 404, from escaping. In further exemplary embodiments, after the tag 300 is deposited in a container 400, it may be interrogated by a reader. The reader may be capable of extracting information from the RFID tag 300 that the RFID tag 300 may be storing. For example, the RFID tag 300 could store information on the type and amount of medication that may have been originally disposed in container 400. The RFID tag 300 may also include data regarding when any medication disposed in container 400 was manufactured, manufacturing location, production lot information and an expiration date for any medication disposed in container 400. The lid 402 sealing the container 400 makes the RFID tag 300, as well as any contents of container 400, for example medication 404, tamper-proof.

Also, in another exemplary embodiment, if the container 400 contains prescribed medication, the RFID tag 300 could store information regarding the person to whom the medication is prescribed, information regarding the type and amount of medication prescribed, any desired patient history information, information regarding the time and date the prescription was filled, information regarding who filled the prescription, information regarding potential refills of the medication, instructions for the use of the medication and any other desired data, such as lot/batch information of the contents and/or container, packaging dates, production dates and sequences, expiration dates and disposal information and any other consumer based information. The tags provided by the present invention may be used in a number of applications including over-the-counter medications, supplements and the like.

In still other exemplary embodiments, an RFID tag 300 may be used in any of a variety of other applications. As one non-limiting example, an RFID tag 300 may be disposed in any type of shipping container or any other type of packaging known to one having ordinary skill in the art, for example a cardboard box or plastic packaging for an item. The RFID tag 300 could then be used to store data such as the date of manufacture of the product, a manufacturer's suggested retail price for the product, warranty information for the product or any other desired information.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for tracking, comprising:
   a radio frequency identification (RFID) blank with indicia printed thereon;
   an RFID antenna and a chip coupled on one side of the RFID blank;
   a carrier web coupled to the RFID blank, wherein said carrier web and a side of the RFID blank are folded over, the RFID antenna and chip;
   a laminated seal means disposed over the RFID blank, the RFID antenna and the chip and the carrier web after they are folded on top of each other for binding the folded portions together and sealing, the resulting tag from outside elements to form an RFID tag, said seal means being sufficiently transparent to allow said printed indicia to be read;
   a container into which the RFID tag is visibly disposed, said container being sealed by a tamper-proof lid;
   wherein the RFID tag stores information regarding contents of the container.

2. The system of claim 1, wherein the printed indicia is human readable.

3. The system of claim 1, wherein the information regarding contents of the container includes manufacturing location, batch and lot information and date information.

4. The system of claim 1, further comprising:
   the separation of the RFID tag from a plurality of other RFID tags after the laminated seal means is disposed over the RFID blank, the RFID antenna and the chip and carrier web to form the RFID tag.

5. The system of claim 1, wherein the printed indicia is printed on an outside portion of the RFID blank.

6. The system of claim 5, wherein the printed indicia is machine readable indicia.

7. The system of claim 2, wherein the printed indicia is a warning.

8. A method of supplying data for contents housed in a container, comprising:

printing indicia on an outside portion of a plurality of blanks;

placing radio frequency identification (RF1D) antennas and chips on an inside portion Of the plurality of blanks;

placing the plurality of blanks on a carrier web;

folding the plurality of blanks onto themselves;

laminating the plurality of blanks to bind the folded portions together and to seal the resulting tag from outside elements;

separating individual blanks from the plurality of blanks to form individual RF1D tags;

placing an RFID tag into a visible position, within a container;

sealing to container to prevent tampering with the RFID tag; and reading data from the RFID tag placed in the container with an RFID reader.

9. The method of claim 8, further comprising:

coupling the plurality of blanks to each other.

10. The method of claim 9, wherein the blanks are coupled using the carrier web.

11. The method of claim 8, wherein the laminating of the plurality of blanks seals them from outside elements.

12. The method of claim 8, wherein the printing of indicia on the outside portion of the plurality of blanks is performed substantially simultaneously to the placing of the REID antennas and chips on the inside portion of the plurality of blanks.

13. The method of claim 8, wherein the folding of the plurality of blanks onto themselves is performed one blank at a time.

14. The method of claim 8, wherein the folding of the plurality of blanks onto themselves is performed to each of the blanks substantially simultaneously.

15. A system of preventing tampering with an RFID tag, comprising:

means for providing a radio frequency identification (RFID) substrate;

means for printing human-readable indicia on the RFID substrate;

means for disposing a RFID chip and antenna on the RFID substrate;

means for substantially simultaneously folding and laminating the RFID substrate to bind the folded portions of the substrate together and to form an RFID tag that is sealed against outside elements;

means for disposing the RFID tag in a container in a visible location; and means for sealing the container.

16. The method of supplying data for contents housed in a container defined in claim 8, wherein the folding and laminating steps are performed substantially simultaneously.

\* \* \* \* \*